(12) United States Patent
Laurichesse

(10) Patent No.: US 9,974,222 B2
(45) Date of Patent: May 22, 2018

(54) AGRICULTURAL MACHINE FOR REVISITING A PLANTED PLOT; ASSOCIATED METHOD

(71) Applicant: CENTRE NATIONAL D'ETUDES SPATIALES, Paris (FR)

(72) Inventor: Denis Laurichesse, Tournefeuille (FR)

(73) Assignee: CENTRE NATIONAL D'ETUDES SPATIALES, Paris (FR)

( * ) Notice: Subject to any disclaimer, the term of this patent is extended or adjusted under 35 U.S.C. 154(b) by 0 days. days.

(21) Appl. No.: 15/026,791

(22) PCT Filed: Oct. 3, 2014

(86) PCT No.: PCT/EP2014/071271
§ 371 (c)(1),
(2) Date: Apr. 29, 2016

(87) PCT Pub. No.: WO2015/049383
PCT Pub. Date: Apr. 9, 2015

(65) Prior Publication Data
US 2016/0255758 A1 Sep. 8, 2016

(30) Foreign Application Priority Data
Oct. 4, 2013 (FR) ...................................... 13 59630

(51) Int. Cl.
*G01D 1/02* (2006.01)
*A01B 79/00* (2006.01)
(Continued)

(52) U.S. Cl.
CPC ............ *A01B 49/065* (2013.01); *A01B 39/02* (2013.01); *A01B 69/008* (2013.01);
(Continued)

(58) Field of Classification Search
None
See application file for complete search history.

(56) References Cited

U.S. PATENT DOCUMENTS

| 6,199,000 B1 | 3/2001 | Keller et al. |
| 2003/0009282 A1 | 1/2003 | Upadhyaya et al. |
| (Continued) | | |

FOREIGN PATENT DOCUMENTS

| DE | 199 58 761 A1 | 6/2001 |
| DE | 199 61 442 A1 | 7/2001 |
| (Continued) | | |

OTHER PUBLICATIONS

Egon, DE19958761, Written Description, EPO translation dated Feb. 22, 2017.*
(Continued)

*Primary Examiner* — Kevin P Mahne
(74) *Attorney, Agent, or Firm* — Young & Thompson

(57) ABSTRACT

This machine includes a tool (30) actuated by an actuating module (32); a dual-frequency satellite positioning module (40) able to take into account corrections relative to the disruptions affecting the propagation of radio navigation signals emitted by each of the visible radio navigation satellites and that are caused by the ionosphere, so as to determine an absolute position of the machine, and consequently of the tool, which is precise to within a centimeter; and a computer (50) able to compare the instantaneous absolute position of the tool and an absolute position of a current revisiting point, selected from among the revisiting points of a revisiting plan, the computer then being able to command the actuation module.

16 Claims, 3 Drawing Sheets

(51) Int. Cl.

| | | |
|---|---|---|
| *A01B 69/04* | (2006.01) | |
| *A01B 49/06* | (2006.01) | |
| *A01C 21/00* | (2006.01) | |
| *A01B 39/02* | (2006.01) | |
| *A01C 7/00* | (2006.01) | |
| *G01S 19/13* | (2010.01) | |

(52) U.S. Cl.
CPC .............. *A01B 79/005* (2013.01); *A01C 7/00* (2013.01); *A01C 21/00* (2013.01); *A01C 21/002* (2013.01); *G01S 19/13* (2013.01)

(56) References Cited

U.S. PATENT DOCUMENTS

| | | | |
|---|---|---|---|
| 2003/0028321 A1 | 2/2003 | Upadhyaya et al. | |
| 2003/0187560 A1* | 10/2003 | Keller | A01B 79/005 701/50 |
| 2010/0085252 A1* | 4/2010 | Laurichesse | G01S 19/44 342/357.59 |
| 2011/0210888 A1 | 9/2011 | Mercier et al. | |
| 2013/0261870 A1 | 10/2013 | Halder et al. | |
| 2015/0051779 A1* | 2/2015 | Camacho-Cook | A01B 69/008 701/23 |

FOREIGN PATENT DOCUMENTS

| | | |
|---|---|---|
| EP | 2 335 085 A0 | 6/2011 |
| EP | 2 404 492 A2 | 1/2012 |
| FR | 2 914 430 A1 | 10/2008 |
| WO | 2008/125458 A1 | 10/2008 |
| WO | 2010/034694 A1 | 4/2010 |

OTHER PUBLICATIONS

Egon, DE19958761, Claims, EPO translation dated Feb. 23, 2017.*
International Search Report, dated Jan. 15, 2015, from corresponding PCT Application.
French Search Report, dated May 22, 2014, from corresponding French Application.

* cited by examiner

AGRICULTURAL MACHINE FOR REVISITING A PLANTED PLOT; ASSOCIATED METHOD

BACKGROUND OF THE INVENTION

Field of the Invention

The present invention relates to an agricultural machine for revisiting a planted plot.

Revisiting refers to the performance of an agricultural operation on a parcel that has already been planted.

This may be an operation associated with growing the species already planted on the parcel. This for example involves passing back between the plants of the species that has already been planted, called first species, to perform hoeing or weeding of the soil, spraying fertilizer, or an operation to harvest plants of the first species.

This may also involve an operation relative to growing a second species on the already-planted parcel. This for example involves passing back between the plants of the first species to perform an operation related to growing the plants of the second species, such as sowing seeds of the second species, hoeing or weeding the soil, spraying a fertilizer at the base of the plants of the second species, etc.

This may also be an operation to harvest plants of the second species, without harvesting those of the first species. This type of agriculture, called mixed, where several species are grown at the same time on a same parcel, is regaining interest because it is very advantageous in terms of reducing the quantity of fertilizer used, saving soil, etc.

Description of the Related Art

Document EP 2,404,492 discloses, for the specific case of a vine, a multifunctional agricultural machine in particular making it possible to revisit vines for a hoeing operation of the soil around the vine-stocks. The hoeing tool of the machine is actuated automatically around the vine-stocks based on a signal generated by a proximity sensor, which assesses the distance between the tool and the vine-stock.

The fact that the already-farmed species is a vine-stock makes it possible use a proximity sensor. However, the use of a proximity sensor can be generalized to all types of plants.

Furthermore, a vine-stock is fairly hardy. It allows an actuating error of the hoeing tool. This is not the case for a plant, such as corn or wheat, whereof the stems remain fragile, especially in the first months of growth, when these plants are in the shoot stage and the revisiting operation must be done.

Furthermore, document US 2003/0009282 discloses an agricultural machine for planting seeds that is equipped with satellite positioning means of the "real-time kinematic" (RTK) type. Based on the actuating moment of the tool making it possible to plant a seed and the instantaneous position delivered by the positioning means, a computer is able to store the position of each plant seed, in a database.

Positioning means with RTK satellites require the use of a reference receiver, on the ground, having a known position. This is determined during an initial calibration step of the satellite positioning means.

However, satellite positioning means of the RTK type only make it possible to determine a position that is precise to within about ten centimeters. Such precision is not sufficient for a revisiting operation.

Furthermore, satellite positioning means of the RTK type have a significant time deviation. This deviation is not acceptable in the case of an agricultural machine intended to perform a revisiting operation after a period of several weeks or several months. Indeed, any deviation in the positioning of the hoeing tool would lead to working a zone in the soil with a high risk of destroying the farmed plants located therein.

To use such a positioning means, it is then necessary, during the revisiting, to determine the position of the reference receiver by once again performing the calibration step. This step is tedious. It must be carried out by the operator of the agricultural machine, which leads to errors. Lastly, during revisiting, it is necessary for each position measurement to be corrected for the deviation between the position of the reference sensor at the time of planting and the position of the reference receiver at the revisiting time.

There is therefore a need for an improved agricultural machine making it possible to perform an operation related to revisiting a planted parcel simply and automatically.

BRIEF SUMMARY OF THE INVENTION

The invention aims to meet this need.

To that end, the invention relates to an agricultural revisiting machine and a method for using said machine according to the claims.

BRIEF DESCRIPTION OF THE DRAWINGS

The invention and its advantages will be better understood upon reading the following description, provided solely as an illustrative and non-limiting example and done in reference to the appended drawings, in which.

BRIEF DESCRIPTION OF THE DRAWINGS

An agricultural revisiting machine 10 will be described in reference to FIG. 1.

The machine 10 includes a body 12.

As for any vehicle, a reference XYZ is associated with the geometric center C of the body 12: the axis X is a longitudinal axis, oriented toward the front of the body; the axis Y is a transverse axis, orienting the body 12 from right to left; and the axis Z is an axis perpendicular to the axes X and Y, oriented upward.

Figure 1:
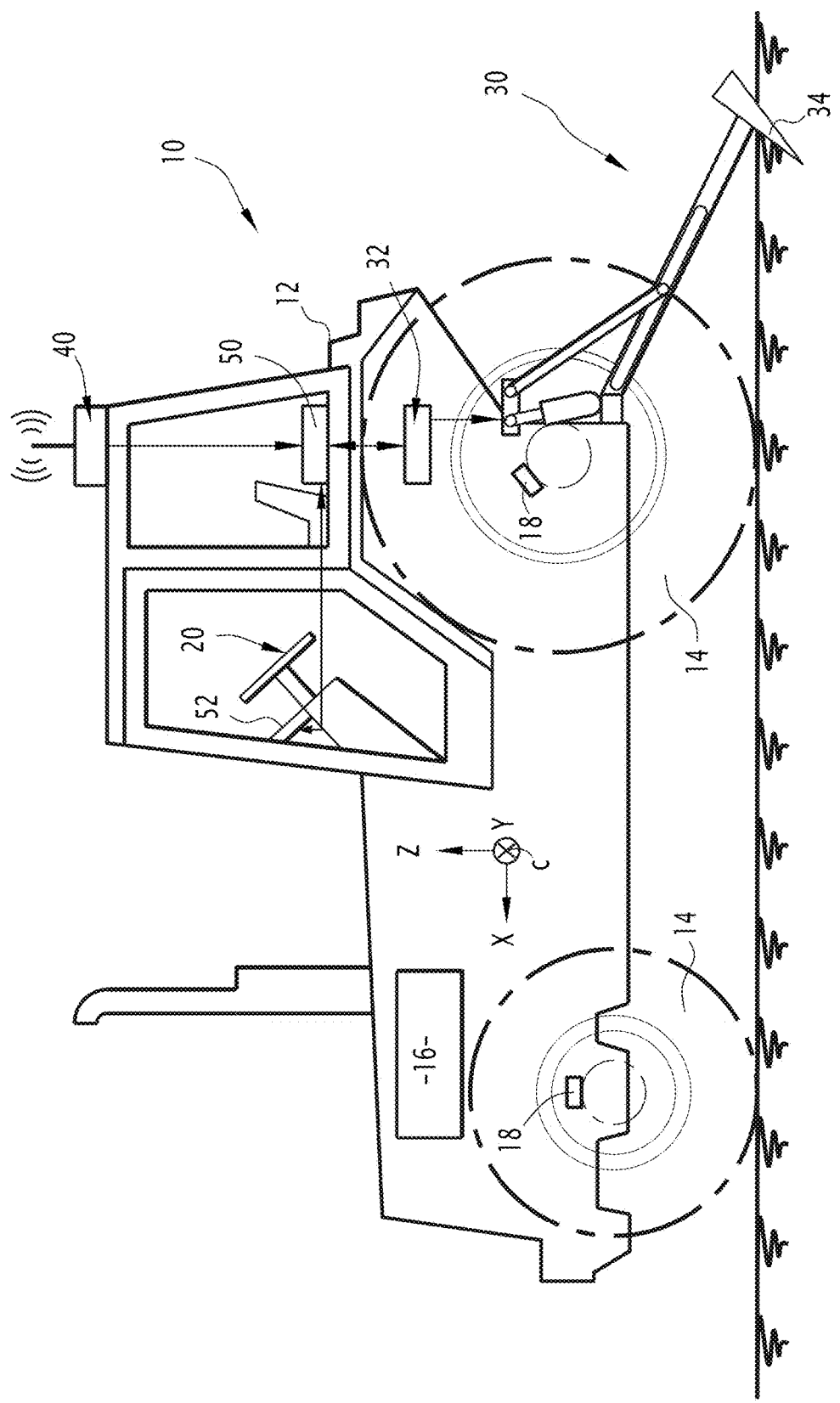
FIG. 1 is a diagrammatic illustration of an agricultural machine.

The machine 10 includes wheels 14, coupled to traction propulsion means, such as a motor 16, and braking means, such as brakes 18, and steering means, generally designated by reference 20 in FIG. 1.

The propulsion and steering means are designed to allow a driver to control the movement of the machine 10 along the desired trajectory.

Alternatively, the propulsion and steering means are actuated automatically by a piloting module of the machine. The latter is then fully automated and behaves like a robot, the desired trajectory along which the machine is moved then being a computed trajectory.

The machine 10 includes a tool 30, mounted at the rear of the body 12.

The machine 10 is multifunctional, and the tool 30 is mounted removably on the body 12.

The tool 30 is chosen based on the revisiting operation to be performed. The tool is chosen from among a hoeing tool, a weeding tool, a raking tool, a tool for sowing seeds, a tool for transplanting plants, a spraying tool, a harvest tool. The tool 30 is mounted temporarily on the body 12.

In the embodiment shown diagrammatically in the figures, the chosen tool 30 is a tool for hoeing the soil.

The machine 10 includes an actuating module 32 of the tool 30, able to actuate the tool 30 in a predetermined manner. Preferably, the actuating module 32 is able to actuate the tool 30 so that the latter performs a characteristic operating cycle. For the case of a hoeing tool, the operating cycle can for example consist, relative to a point of reference on the ground, of hoeing the soil along a first segment, then along a second segment, intersecting the first at 90°.

The movement of the tool during its actuation by the actuating module 32 is fully determined. In particular, the position and orientation of the functional end 34 of the tool 30 relative to the center C and the reference XYZ of the body 12 are known at each moment of the actuation of the tool, based on the instantaneous position of the point C, delivered by the positioning module, and the instantaneous state of the actuating module 32. This information is stored in the actuating module 32.

The machine 10 includes a satellite positioning module 40 able to deliver a position and an absolute orientation of the point C and the reference XYZ of the machine with great precision.

The satellite positioning performance is increased by the module 40 taking into account disruptions affecting the propagation of radio navigation signals emitted by the satellites, which are caused by the ionosphere.

For example, the module 40 is the precise, absolute and deviation-free satellite positioning module described in document WO 2008/125458. This positioning module implements an algorithm called "PPP with whole undifferentiated ambiguity resolution", where "PPP" stands for "Precise Point Positioning".

More specifically, each satellite of the constellation of satellites broadcasts a first radio navigation signal on a first frequency and a second radio navigation signal on a second frequency different from the first.

A reference station on the ground, belonging to a network of stations, processes the radio navigation signals coming from one of the visible satellites, so as to determine corrections, such as an internal delay of the satellite and a whole value of the "wide-lane" ambiguity for the reference station. This processing provides for:

receiving first and second radio navigation signals;
an undifferentiated code measurement and an undifferentiated phase measurement;
computing a raw value of the "wide-lane" phase ambiguity;
setting an internal delay of the satellite as well as the whole value of the "wide-lane" phase ambiguity for the reference station.

The corrections thus determined are sent to broadcasting means toward the satellite positioning modules of the end users.

A satellite positioning module then performs the following processing:

receiving the first and second radio navigation signals from a visible satellite of the constellation of satellites;
performing, for each of the first and second received signals, an undifferentiated code measurement and an undifferentiated phase measurement;
computing a raw value of the "wide-lane" phase from undifferentiated code measurements and undifferentiated phase measurements;
acquiring an internal delay of the satellite and determining a whole value of the "wide-lane" ambiguity based on said raw value and said internal satellite delay.

Aside from the internal delay of the satellite, other corrections relative to the satellite visible by the receiver can be computed by the reference stations, sent to the user module and used by the latter for the precise, to within a centimeter, and absolute determination of its instantaneous position.

The module can acquire the corrections relative to each visible satellite from a database, for example accessible via the Internet. The module is equipped with a wireless communication means, to establish a link with a base station of a radio communication infrastructure connected to the Internet.

The module can also acquire the corrections relative to each visible satellite by capturing appropriate messages, broadcast by SBAS (Satellite-Based Augmentation System) satellites.

Alternatively and more generally, it is possible to make other "wide-lane" and/or "narrow-lane" combinations to determine the corrections at the reference stations, for both dual-frequency and tri-frequency receivers, as for example described in patent EP 2,335,085 B1.

In any case, the module 40 is a dual-frequency module to be able to receive the first and second radio navigation signals.

The machine 10 includes a computer 50 including computation means, such as a processor, and storage means, such as a random-access memory and a read-only memory as well as an input/output interface.

The computer 50 is connected to the positioning module 40, the actuating module 32 of the tool 30, and a monitor 52, for example a touchscreen, including a man/machine interface usable by the driver of the machine 10.

The computer 50 in particular stores a revisiting plan of the parcel, as will be described below in relation to the usage method of the machine 10. The revisiting plan includes a plurality of geographical revisiting points, around each of which the revisiting operation must be done.

From a revisiting plan, the computer 50 is able to develop, online or off-line, a journey through the parcel that the machine 10 must follow to allow the tool to perform the revisiting operation around each of the revisiting points.

The journey developed by the computer 50 is displayed on the monitor 52 placed in the cabin to indicate to the driver of the machine 10 how he must steer the machine.

Figure 2:
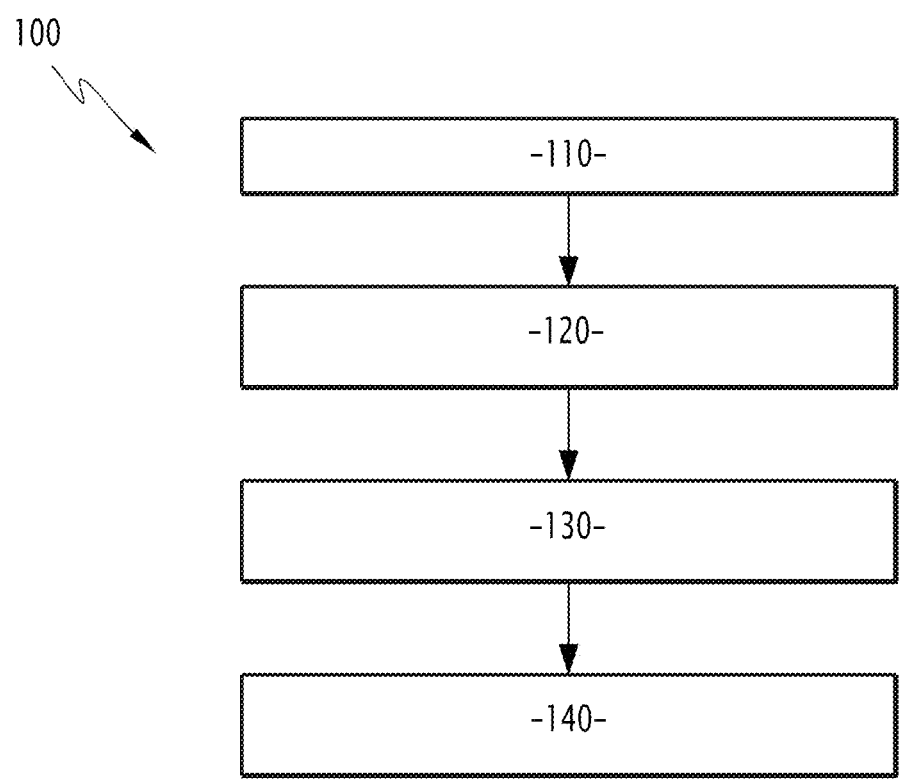
FIG. 2 is a block diagram of the method implemented by the machine of FIG. 1.

As shown in FIG. 2, the method 100 includes a step 110 consisting of performing an identification of the parcel to be farmed. During this step, the operator measures different parameters that may affect how this parcel is farmed. Thus, certain parameters, for example the slope of the parcel, its sunshine throughout the year, the rainfall during the year, the humidity of the soil at different depths and for different periods of the year, the quality of the soil, etc., are measured.

The method 100 continues with a step 120 consisting of determining a farming plan of the parcel. This step is advantageously carried out on a personal computer, which executes a software program to assist with farming.

The operator first determines whether he wishes to grow one or more species on the parcel in question and the nature of the first and optionally second species to be grown.

The farming plan is next optimized by determining the shape and orientation of the rows of plants on the parcel, the distance between the rows of plants of the first species, the pitch between the plants of the first species along a row, the times of year to perform the different operations related to growing the first species, from sowing the seeds to the final harvest. This information is stored in the farming plan.

If the operator chooses to grow two species at the same time on the parcel, the farming plan is optimized by determining similar information for the plants of the second species. The optimization of the farming plan for the first species and that for the second species is done simultaneously, since the positions of the plants of the first species affect the positions of the plants of the second species, and vice versa.

Then, during a step 130, the seeds of the first species are sown.

Advantageously, the machine 10 is used, but with a tool 30 making it possible to sow seeds.

A sowing plan is extracted from the farming plan. The sowing plan gives the geographical points of the parcel where seeds of the first species must be sown.

The sowing plan is loaded in the memory of the computer 50 of the machine 10. The operating parameters of the current tool 30 are also loaded in the memory of the computer 50.

The computer 50 determines the journey that the machine 10 must follow so that the tool 30 can plant seeds of the first species in each of the points of the sowing plan.

This journey is displayed in the cabin so that the driver of the machine 10 can steer the machine so as to follow this journey as closely as possible. At each moment, the satellite positioning module delivers the instantaneous position of the point C of the machine, and the computer 50 determines the deviation between the point of the machine and the journey to be followed, the driver being invited to steer the machine to reduce this deviation.

The machine 10 moves on the parcel such that the tool follows a trajectory overhanging each point indicated in the sowing plan.

When the positioning module 40 delivers an absolute position which, corrected by the computer 50 for a geometric deviation between the center C of the machine 10 and the functional part of the tool 30, corresponds to a point of the sowing plan, the computer 30 emits a signal to the actuating means 32 so that the tool 30 sows a seed. That seed is then precisely sown at the point whereof the position is indicated in the sowing plan.

The method continues with a step 140 consisting of revisiting the parcel several weeks or months after the sowing step 130 for the first species. The parcel is therefore already planted at that time.

For example, the revisiting operation of the planted parcel consists of hoeing the soil around the plants of the first species that were sown in step 130.

The farmer mounts a tool 30 on the body 12 of the machine 10 based on the revisiting operation to be done. Here, a hoeing tool 30 is fixed to the body 12.

A revisiting plan is extracted from the farming plan.

For the case of an operation consisting of hoeing the soil around plants of the first species, the revisiting plan corresponds to the sowing plan, i.e., the plan for the parcel on which the absolute positions are shown where each seed of the first species was sown.

The revisiting plan is stored in the computer 50, as are the operating parameters of the hoeing tool 30.

The computer 50 generates a journey of the machine 10 through the parcel, such that the tool 30 can hoe the soil around each point indicated in the revisiting plan, while avoiding destroying the plants of the first species.

The journey generated by the computer 50 is displayed in the cabin so that the driver follows the computed journey.

The machine 10 is moved through the parcel such that the tool 30 successively passes near each of the revisiting points indicated in the revisiting plan.

While the machine 10 travels over the parcel, the positioning module 40 delivers the absolute position of the center C and the absolute orientation of the reference XYZ of the machine 10.

Taking into account a geometric shift between the center C of the machine 10 and the functional part 34 of the tool 30, the computer 50 determines the absolute position of the point of the soil overhanging which the functional part of the tool is located at the current moment.

Each time the computer 50 determines that the tool 30 is located near a revisiting point, the computer 50 sends an appropriate signal to the actuating means 32.

When this signal is received, the actuating means 32 actuates the tool 30 so that it performs an operating cycle around a point of reference that coincides at that moment with the revisiting point in question.

The tool 30 then hoes a zone of the soil which, in fact, is situated around the point where a plant of the first species is planted.

The machine 10 is steered through the parcel to perform the entire revisiting operation.

Alternatively, the hoeing operation can be conducted by hoeing the soil continuously by crossing the passes, each past being done along a line following a set of points where the plants of the first species are planted as closely as possible.

In still another alternative, the revisiting operation is connected to growing a second species. For example, the revisiting operation of the planted parcel consists of sowing seeds of the second species between the plants of the first species having been sown in step 130.

The farmer mounts a tool on the body 12 of the machine 10 suitable for sowing seeds of the second species.

A revisiting plan is extracted from the farming plan.

The revisiting plan corresponds to the geographical points of the parcel where the seeds of the second species must be planted.

The revisiting plan is loaded in the computer 50 of the machine 10.

From the revisiting plan, the computer 50 develops a journey through the parcel allowing the sowing tool to overhang each revisiting point, without the machine or the actuation of the tool destroying the plants of the first species.

While the machine 10 travels over the parcel, the positioning module 40 delivers the absolute position of the center C and the absolute orientation of the reference XYZ of the machine 10.

Taking into account a geometric shift between the center C of the machine 10 and the functional part of the sowing tool, the computer 50 determines the absolute position of the point of the soil overhanging which the functional part of the sowing tool is located at the current moment.

Each time the computer 50 determines that the sowing tool is overhanging a revisiting point, the computer 50 sends an appropriate signal to the actuating means for the sowing tool.

When this signal is received, the actuating means actuates the sowing tool so that it performs an operating cycle around a point of reference that coincides at that moment with the revisiting point in question.

The sowing tool plants a seed at a point which, in fact, coincides with the revisiting point.

A first revisiting operation can be followed by other revisiting operations. For example, after having sown a second species, another revisiting operation could consist of hoeing the soil around the plants of the first species and/or the plants of the second species. An appropriate revisiting plan is extracted from the farming plan, which includes, as revisiting point, the points where the seeds of the first and second species have been sown.

A revisiting operation may also consist of harvesting the plants of the first (second, respectively) species without touching those of the second (first, respectively) species.

Figure 3:
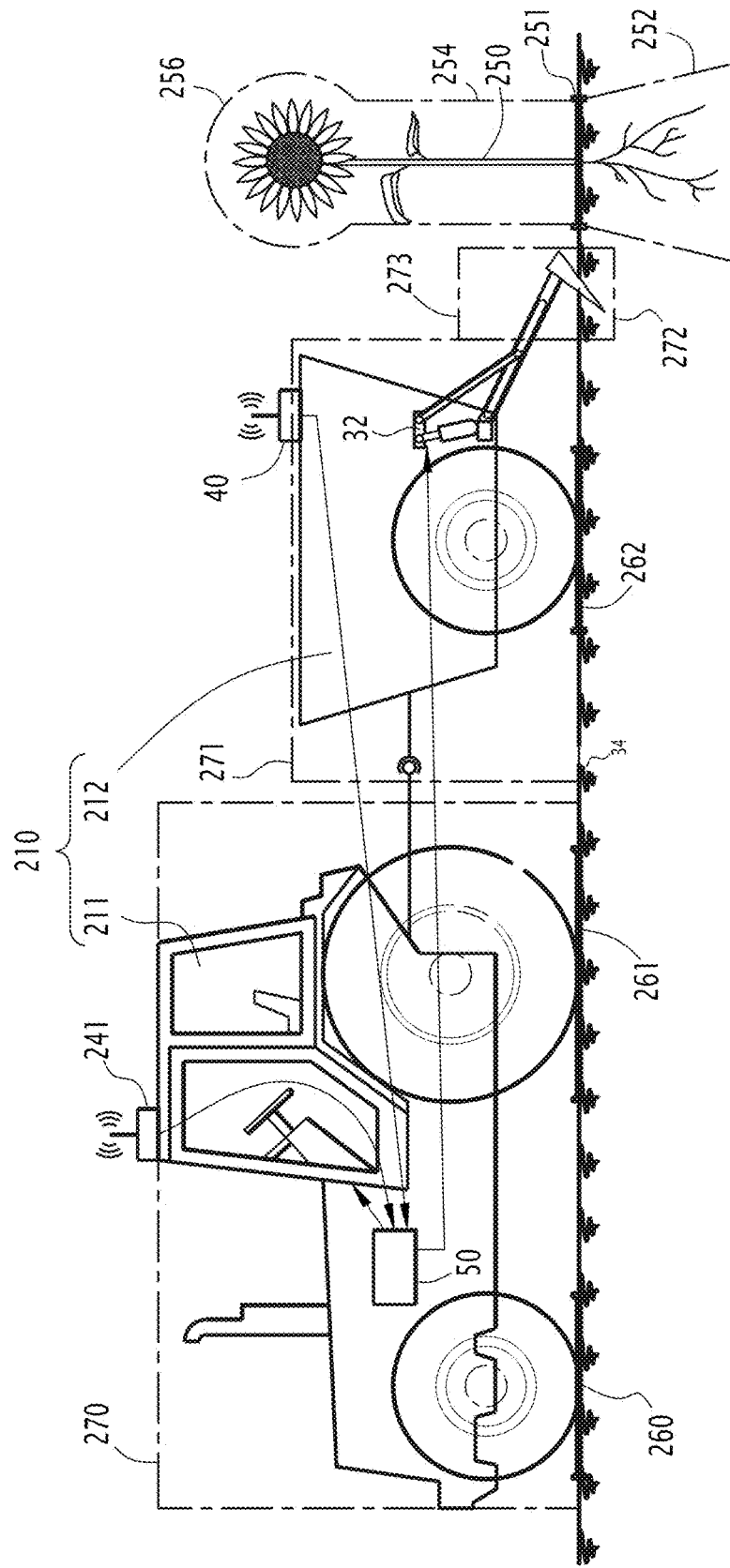
FIG. 3 is a diagrammatic illustration of an alternative embodiment.

In another embodiment shown in FIG. 3, the agricultural machine 210 is made up of a tractor 211 and a trailer 212, hitched to the tractor. The trailer is for example hitched by means of a ball joint, such that the different parts of the machine 210 are articulated relative to one another.

The revisiting tool being supported by the trailer 212, the satellite positioning module 40 is then implanted on the trailer to obtain a measurement of the position of the tool at each moment.

However, it is desirable, during the revisiting of the planted parcel, not only for the tool to perform the operation associated with the revisiting, but also for the machine as a whole not to destroy the plants 250 that have already been planted on the parcel through which the vehicle must travel.

In a first alternative, only the footprint of the machine 210 is considered.

The shape of the footprint of the tractor and that of the trailer are predetermined. It corresponds to the imprint 260 of the front tires of the tractor 211, the imprint 261 of the rear tires of the tractor 211, the imprint 262 of the tires of the trailer 212.

Furthermore, a footprint 251 is associated with each plant 250 that has already been planted. For example, a sunflower seed planted at a particular point P of the parcel is associated with an imprint of the plant, for example corresponding to a disc centered on the point P and having a predefined radius.

The journey that the tractor must follow for the tool, supported by the pulled trailer, to pass through the revisiting points of the revisiting plan is determined taking into account the constraint according to which, at each point of this journey, the footprint of the machine must not cover part of the imprint of a plant that has already been planted.

The optimal journey thus computed is next loaded into the memory of the computer 50 onboard the machine 210, preferably onboard the tractor 211. Then, the tractor travels through the parcel following the optimal journey. The tool carried by the pulled trailer is actuated to perform the revisiting operation regularly.

In a second alternative, the steric footprint of the machine is considered, i.e., its volume, or at the very least a gauge within which its volume fits. This gauge includes a part above the soil and a part below the soil: the part above the soil corresponds to the gauge of the tractor 270, the gauge of the trailer 271 and the part of the gauge of the tool above the soil 273; the part below the soil corresponds to the part of the gauge of the tool below the soil 272, for example when the tool is actuated and pushes into the soil over a predetermined depth.

The steric footprints of the tractor, the trailer and the tool are predetermined. Their relative positions during the different possible movements of the machine 210 and the actuation of the tool make it possible to define the steric footprint of the machine.

Furthermore, a steric footprint is associated with each plant 250 that has already been planted. For example, a sunflower seed planted at a particular point P of the parcel has an associated imprint for example corresponding to the junction of a cylinder 254 for the stem (centered on the point, having a predefined radius and a predefined height), a sphere 256 corresponding to the flower (at an upper part of the stem), and a cone 252 corresponding to the roots of the plant (the apex of the cone coinciding with the lower end of the cylinder of the stem).

The journey that the tractor must follow for the tool, supported by the pulled trailer, to pass through the revisiting points of the revisiting plan is determined taking into account the constraint according to which, at each point of this journey, the steric footprint of the machine must not interfere with a steric footprint of a plant that has already been planted.

The optimal journey thus computed is next loaded in the memory of the computer onboard the tractor. Then, the tractor travels through the parcel following the optimal journey. The tool carried by the pulled trailer is actuated to perform the revisiting operation regularly.

In order to verify that the tractor is in fact following the computed optimal journey, it is necessary to know its position at each moment.

To that end, the tractor may also be equipped with a dual-frequency satellite positioning module 241 able to take into account corrections relative to disruptions affecting the propagation of radio navigation signals emitted by each of the visible radio navigation satellites and that are caused by the ionosphere, so as to determine an absolute and precise position of a characteristic point of the tractor. In this way, it is possible to measure an absolute position of the tractor at all times. If this position of the tractor or that of the trailer deviates from the optimal journey to be followed, an appropriate correction is applied to the means for steering the movement of the tractor. The positioning module of the trailer makes it possible to determine the moment at which the tool overhangs a revisiting point, in order to command the actuating module of the tool and thus perform the corresponding revisiting operation.

In one alternative, the instantaneous position of the tractor is determined by using a kinematic model of the assembly formed by the tractor and the trailer with its tool. This model makes it possible to determine the instantaneous position of the tractor, from the instantaneous position of the trailer and optionally its past positions, delivered by the satellite positioning module with which the trailer is equipped.

In still another alternative, falling between the two previous alternatives, if the trailer is provided with a satellite positioning module, the tractor is simply provided with an inertial measurement unit. The latter periodically delivers measurements of the position and/or speed of the tractor relative to a calibration position and speed of the inertial measurement unit. For example, the calibration is done at a zero speed and while the trailer is aligned with the tractor. By correcting the position delivered by the satellite positioning module by a predetermined quantity, which corresponds to the vectorial distance between the inertial measurement unit and the satellite positioning module, the calibration position of the inertial measurement unit can be determined.

Thus, as indicated above, it is possible to monitor the movement of the tractor in order to allow the tool to perform the revisiting operation according to the revisiting plan, while preventing the machine from destroying the plants that have already been planted.

The optimal journey that the machine must follow is computed, on the ground, off-line, by an appropriate system, or by the onboard computer on the machine. In the latter case, the estimate of the journey can be done off-line, for example before starting the revisiting operation, or online (i.e., in real-time) during the revisiting operation. The latter solution offers the possibility of taking the actual movements of the machine into account.

The invention claimed is:

1. An agricultural revisiting machine performing a revisiting operation of a planted parcel, comprising:
    a tractor;
    a trailer, the trailer being hitched to the tractor;
    an actuating module;
    a tool actuated by the actuating module, the tool and the actuating module being carried by the trailer;
    a dual-frequency satellite positioning module carried by the trailer, the dual-frequency satellite positioning module taking into account corrections relative to disruptions affecting a propagation of radio navigation signals emitted by each visible radio navigation satellite of a set of visible radio navigation satellites and caused by an ionosphere, so as to determine, at each moment, an absolute position of the machine, and consequently of the tool, which is precise to within a centimeter; and,
    one of a computer and an inertial measurement unit located on the tractor for determination of a position thereof, the one of a computer and an inertial measurement unit using, as input, measurements done by the satellite positioning module and implementing a kinematic model of the agricultural revisiting machine, the one of a computer and an inertial measurement unit comparing the absolute position of the tool and an absolute position of a current revisiting point, selected among revisiting points of a revisiting plan stored in a storage means of the one of the computer and the inertial measurement unit, the one of the computer and the inertial measurement unit commanding the actuation module based on a relative distance between the absolute position of the tool and the absolute position of the current revisiting point,
    wherein the one of a computer and an inertial measurement unit is adapted for the revisiting operation to be performed in a parcel where seeds/plants of a first species have been sowed/planted earlier and the revisiting operation comprises one of a post-sowing/planting operation to be performed on the plants of the first species and a sowing/planting operation of seeds/plants of a second species.

2. The machine according to claim 1, wherein the tool is a hoeing tool, said revisiting plan includes a plurality of revisiting points, each revisiting point corresponding to a point of the parcel where a plant of the first plant species has been planted, and the computer commands the actuating module of the tool to hoe a soil around a current revisiting point selected in the revisiting plan.

3. The machine according to claim 1, wherein the first plant species having been planted on the parcel, the tool is a sowing tool, and each of the revisiting points corresponds to a point of the parcel where a seed of the second species must be sown.

4. The machine according to claim 1, wherein the computer selects the current revisiting point of the revisiting plan based on a journey followed by the machine through the parcel.

5. The machine according to claim 1, wherein the computer determines and/or follows a journey allowing a movement of the machine through the parcel such that the tool can perform the revisiting operation for each point of the revisiting plan.

6. The machine according to claim 5, wherein the journey is determined under a constraint, this constraint consisting of imposing that, at all points of the journey, an imprint of the machine does not interfere with an imprint associated with a plant that has already been planted.

7. The machine according to claim 6, wherein the imprint of the machine and the imprint associated with a plant that has already been planted are of the footprint or steric footprint type.

8. The machine according to claim 1, wherein the satellite positioning module is configured to acquire corrections broadcast by a network of reference stations.

9. The machine according to claim 8, wherein the satellite positioning module implements a Precise Point Positioning algorithm for processing radio navigation signals of a precise point positioning type with undifferentiated whole ambiguity resolution.

10. A system comprising:
    computing means for developing a farming plan for a parcel and to extract a sowing plan and revisiting plan from said farming plan;
    a first machine for sowing a seed of the first species according to the sowing plan; and
    a second machine, according to claim 1, able to perform the revisiting operation for the planted parcel, according to the revisiting plan.

11. The system according to claim 10, the computing means is configured to determine, under a constraint, a journey that must be followed by the second machine to perform the revisiting operation, the constraint consisting of imposing that, at any point of the journey, an imprint of the machine does not interfere with an imprint associated with a plant that has already been planted.

12. An agricultural method for revisiting a parcel planted with a first species, geographical points where plants of the first species were planted being known, the method comprising:
    a step for developing a revisiting plan of the planted parcel, based on an agricultural operation to be performed during a revisiting operation and the geographical points where the plants of the first species were planted, the revisiting plan including a plurality of geographical revisiting points; and
    a revisiting step, using an agricultural machine comprising a trailer and a tractor, the trailer equipped with an appropriate tool actuated automatically by an actuating module and with a dual-frequency receiver, the tractor equipped with one or more of an inertial measurement unit and a computer, the one or more of the inertial measurement unit and the computer using measurements by a satellite positioning module and implementing a kinematic model of the machine;
    determining an absolute position of the tool, that is precise to within a centimeter, by implementing processing of received radio navigation signals, which takes into account corrections relative to disruptions affecting propagation of the radio navigation signals emitted by a visible radio navigation satellite among a set of visible radio navigation satellite and caused by an ionosphere, and by commanding an actuating unit as a function of the absolute position of the tool and a current geographical revisiting point, selected in the revisiting plan, wherein the revisiting operation is in a parcel where seeds/plants of a first species have been sowed/planted earlier and comprises one of a post-sowing/planting operation to be performed on the plants of the first species or a sowing/planting operation of seeds/plants of a second species.

13. The method according to claim 12, wherein, the tool being a hoeing tool, the revisiting points of the revisiting plan correspond to points where plants of the first species have been planted, and the revisiting step consists of actuating the tool to hoe soil around each of the revisiting points.

14. The method according to claim 12, wherein, the tool being a sowing tool, the revisiting points of the revisiting plan correspond to geographical points where seeds of a second species must be sown, and in that the revisiting step consists of sowing seeds of the second species at each of the revisiting points.

15. The method according to claim 12, including a step for defining a farming plan for a parcel, a step for planting the first species according to a sowing plan extracted from the farming plan, and at least one revisiting step according to a revisiting plan extracted from the farming plan.

16. The method according to claim 12, including a step for determining an optimal revisiting journey that must be followed by the machine so that the tool performs a required agricultural operation, during which step a constraint is taken into account according to which, at all points of the journey, an imprint of the machine must not interfere with an imprint associated with a plant that has already been planted.

\* \* \* \* \*